US012366341B2

(12) United States Patent
Chen

(10) Patent No.: US 12,366,341 B2
(45) Date of Patent: Jul. 22, 2025

(54) VEHICLE LAMP AND REFLECTOR

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 18/378,698

(22) Filed: Oct. 11, 2023

(65) Prior Publication Data

US 2025/0122988 A1 Apr. 17, 2025

(51) Int. Cl.

| | |
|---|---|
| ***F21S 43/31*** | (2018.01) |
| ***F21S 43/14*** | (2018.01) |
| ***F21V 7/04*** | (2006.01) |
| ***F21W 103/35*** | (2018.01) |
| ***F21W 103/55*** | (2018.01) |

(52) U.S. Cl.

CPC ............... *F21S 43/31* (2018.01); *F21S 43/14* (2018.01); *F21V 7/048* (2013.01); *F21W 2103/35* (2018.01); *F21W 2103/55* (2018.01)

(58) Field of Classification Search

CPC ........................................................ F21S 43/31

See application file for complete search history.

(56) References Cited

U.S. PATENT DOCUMENTS

| | | | | |
|---|---|---|---|---|
| 4,654,761 | A * | 3/1987 | Walsh | F21S 43/26 362/329 |
| 6,102,559 | A * | 8/2000 | Nold | B60Q 1/2607 362/558 |
| 9,688,034 | B2 | 6/2017 | Ovenshire et al. | |
| 10,889,235 | B2 * | 1/2021 | Sassoon | F21S 43/19 |
| 2014/0140091 | A1 * | 5/2014 | Vasylyev | G02B 6/0065 362/606 |
| 2014/0268807 | A1 * | 9/2014 | Kumar | F21S 43/14 702/85 |
| 2018/0306400 | A1 * | 10/2018 | Muegge | F21S 43/30 |

FOREIGN PATENT DOCUMENTS

| | | | |
|---|---|---|---|
| DE | 102006062272 | A1 | 6/2008 |
| DE | 202016104672 | U1 | 12/2017 |
| JP | 2017130316 | A | 7/2017 |
| JP | 2019008922 | A | 1/2019 |

* cited by examiner

*Primary Examiner* — Eric T Eide

(74) *Attorney, Agent, or Firm* — Vichit Chea; Carlson, Gaskey & Olds, P.C.

(57) ABSTRACT

A vehicle lamp includes at least a light source, a primary reflector, and an inner lens. A method of forming the vehicle lamp includes dividing a facet area of the primary reflector into a plurality of smaller facets and analyzing light intensity performance for each smaller facet. The method further includes comparing the light intensity performance for each smaller facet to a predetermined standard, and identifying smaller facets that do not meet the predetermined standard. The method further includes adjusting a position of the light source associated with each smaller facet that does not meet the predetermined standard or re-shaping an outer surface of the primary reflector in an area associated with each smaller facet that does not meet the predetermined standard.

23 Claims, 2 Drawing Sheets

VEHICLE LAMP AND REFLECTOR

TECHNICAL FIELD

This disclosure relates generally to a vehicle lamp and reflector and, more particularly, to a vehicle lamp and reflector that provides a required amount of light intensity while also providing a homogeneous appearance.

BACKGROUND

Vehicles include may different types of lamps, such as daytime running lamps (DRLs) and signal lamps for example, which are required to provide a certain amount of light intensity while also providing an aesthetically pleasing appearance.

SUMMARY

A method of forming a vehicle lamp according to an exemplary aspect of the present disclosure includes, among other things: providing a vehicle lamp that includes at least a light source, a primary reflector, and an inner lens, the method further comprising: dividing a facet area of the primary reflector into a plurality of smaller facets; analyzing light intensity performance for each smaller facet; comparing the light intensity performance for each smaller facet to a predetermined standard; identifying smaller facets that do not meet the predetermined standard; and adjusting a position of the light source associated with each smaller facet that does not meet the predetermined standard or re-shaping an outer surface of the primary reflector in an area associated with each smaller facet that does not meet the predetermined standard.

In a further non-limiting embodiment of the foregoing method, the method includes adjusting the position of the light source associated with each smaller facet that does not meet the predetermined standard or re-shaping the outer surface of the primary reflector in the area associated with each smaller facet that does not meet the predetermined standard until the predetermined standard is met for each facet.

In a further non-limiting embodiment of any of the foregoing methods, analyzing light intensity performance for each smaller facet further includes setting an illuminance sensor on the inner lens, placing an intensity sensor in a far field position, and tracing each smaller facet illuminance contribution from the light source on the inner lens and luminous intensity in the far field position.

In a further non-limiting embodiment of any of the foregoing methods, prior to adjusting a position of the light source or re-shaping an outer surface of the primary reflector in an area associated with each smaller facet that does not meet the predetermined standard, the method includes: for each identified smaller facet that does not contribute a sufficient amount of light intensity to far field intensity, rotating each identified smaller facet until a uniform illuminance is generated on a target area of the inner lens.

In a further non-limiting embodiment of any of the foregoing methods, the method includes, if after rotating the identified smaller facet, the identified smaller facet still does not receive enough light from the light source, adjusting the position of the light source to increase light collect efficiency.

In a further non-limiting embodiment of any of the foregoing methods, the method includes, if adjusting the position of the light source does not result in the identified smaller facet meeting the predetermined standard, subsequently forming a parabola reflector for the identified smaller facet to target a specified area of the inner lens.

In a further non-limiting embodiment of any of the foregoing methods, each smaller facet is comprised of a plurality of cubic surfaces.

In a further non-limiting embodiment of any of the foregoing methods, the light source comprises a plurality of LEDs.

In a further non-limiting embodiment of any of the foregoing methods, the inner lens includes an exterior facing side with a plurality of pillow lenses and an interior facing side that faces the primary reflector.

In a further non-limiting embodiment of any of the foregoing methods, the method includes, forming a textured surface on the interior facing side.

In a further non-limiting embodiment of any of the foregoing methods, the method includes, providing an outer lens over the inner lens.

In a further non-limiting embodiment of any of the foregoing methods, the outer lens is clear.

In a further non-limiting embodiment of any of the foregoing methods, once the predetermined standard is met for each facet area, forming a finalized lamp assembly comprising the light source the primary reflector, the inner lens, and the outer lens.

A vehicle lamp according to another exemplary aspect of the present disclosure includes, among other things: a light source; a primary reflector that reflects light from the light source; an inner lens that receives reflected light from the primary reflector; and wherein the primary reflector is divided into a plurality of facet areas that each have a contoured outer surface specific to each facet area to provide required light intensity and a homogeneous appearance.

In a further non-limiting embodiment of the foregoing vehicle lamp, each facet area is divided into a plurality of smaller facets, and wherein light performance for each smaller facet within an associated facet area is used to determine the contoured outer surface specific to that associated facet area.

In a further non-limiting embodiment of any of the foregoing vehicle lamps, the light source comprises a plurality of LEDs.

In a further non-limiting embodiment of any of the foregoing vehicle lamps, the inner lens includes an exterior facing side with a plurality of pillow lenses and an interior facing side that faces the primary reflector.

In a further non-limiting embodiment of any of the foregoing vehicle lamps, the interior facing side of the inner lens comprises a textured surface.

In a further non-limiting embodiment of any of the foregoing vehicle lamps, an outer lens is provided over the inner lens.

In a further non-limiting embodiment of any of the foregoing vehicle lamps, the outer lens is clear.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle lamp assembly and, more particularly, to a vehicle lamp and reflector assembly that provides a required amount of light intensity while also providing a homogeneous appearance.

Vehicle lamps, such as DRLs, stop lamps, and tail lamps for example, need to provide a homogenous appearance and meet lamp lighting requirements. This becomes challenging when complex three-dimensional shapes are required for these lamps. The complex shape makes optical design difficult to generate a homogeneous look from multiple viewing angles. The subject disclosure provides a unique reflector design that provides a required light intensity and a homogeneous look without increasing expense.

Figure 1:
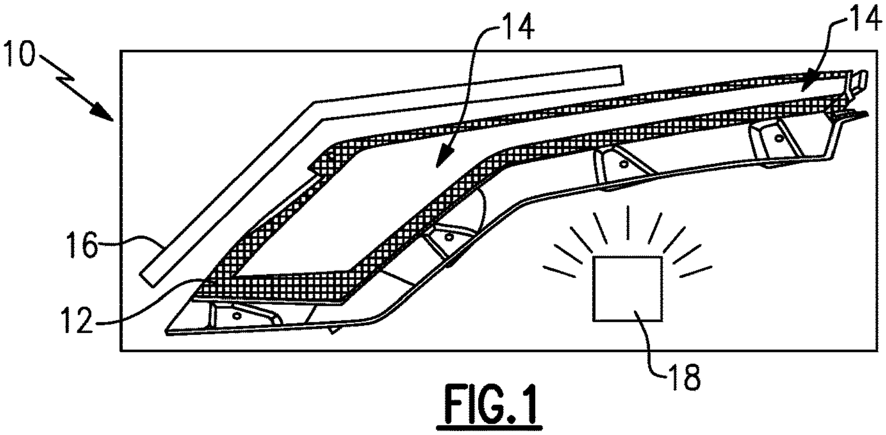
FIG. 1 illustrates a schematic perspective view of a vehicle lamp assembly according to the subject disclosure.
Figure 2:
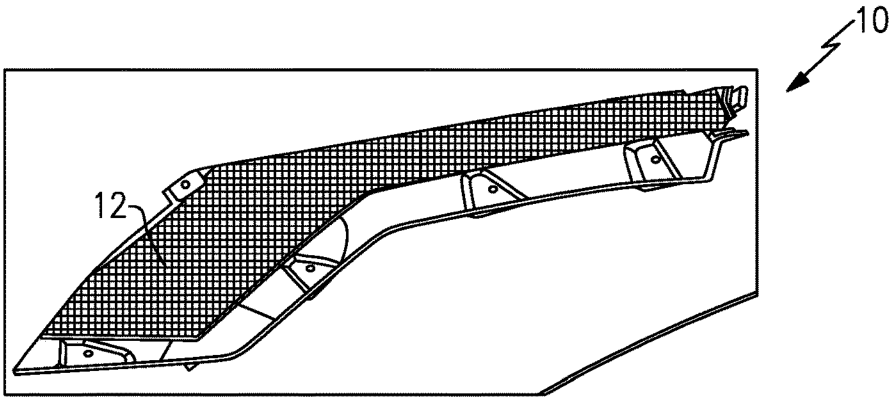
FIG. 2 is a view similar to FIG. 1 but not showing an inner lens of the vehicle lamp assembly.
Figure 3:
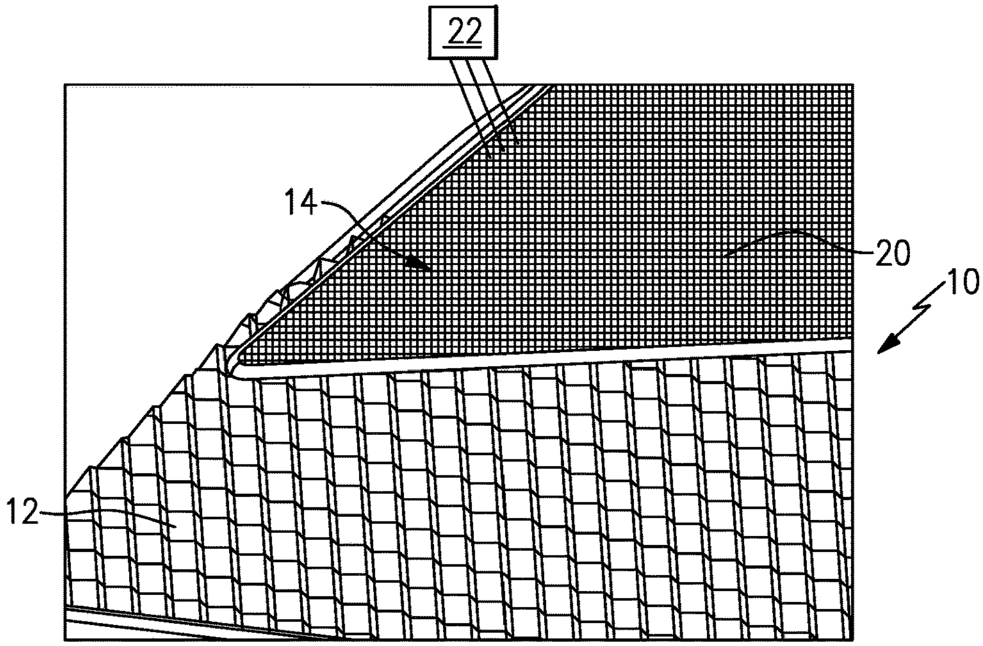
FIG. 3 is an enlarged view of a primary reflector and the inner lens of the vehicle lamp assembly of FIG. 1.
Figure 4:
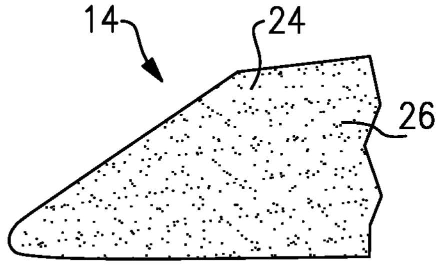
FIG. 4 is a schematic view of an inward facing surface of the inner lens.

With reference to FIGS. 1-2, a vehicle lamp assembly 10 is shown that includes a primary lens or primary reflector 12, an inner lens 14, an outer lens 16, and a light source 18. In one example, the light source 18 comprises one or more light emitting diode (LED) light sources; however, other types of light sources could also be used. In one example, the outer lens 16 is comprised of a clear material. In one example, the inner lens 14 has an exterior facing side 20 with a plurality of pillow lenses 22 (FIG. 3) and an interior facing side 24 that faces the primary reflector 12. In one example, the interior facing side 24 includes a textured surface 26 as shown in FIG. 4. The pillow lenses 22 and grains that form the textured surface 26 are used to diffuse light.

Figure 5:
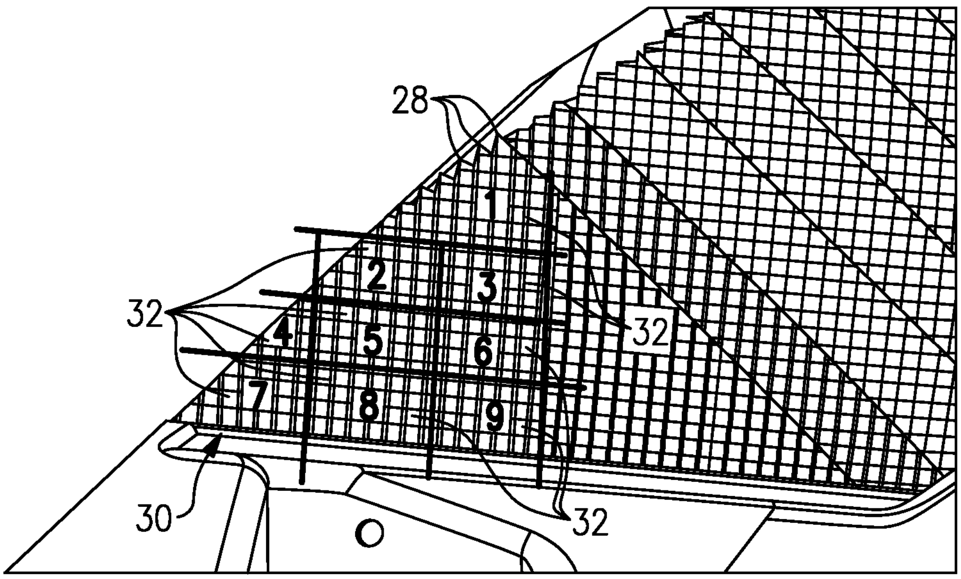
FIG. 5 is a view similar to FIG. 4 but showing a facet area divided into a plurality of smaller facets.

In order to generate homogeneous look, the primary reflector 12 comprises a white reflector with a cubic shape structure 28 as best shown in FIG. 5. In one example, method of forming the vehicle lamp assembly 10 includes dividing a facet area 30 of the primary reflector 12 into a plurality of smaller facets 32. In the example shown in FIG. 5, the facet area 30 is divided into nine smaller facets 32; however, the division can be made with fewer or additional smaller facets. Next, the method includes analyzing light intensity performance for each smaller facet 32, comparing the light intensity performance for each smaller facet 32 to a predetermined standard, and identifying any smaller facets 32 that do not meet the predetermined standard. Those skilled in the art who have the benefit of this description will be able to determine the appropriate standard to apply for light performance requirements of a vehicle lamp. In one example, a position of the light source 18 associated with each smaller facet 32 that does not meet the predetermined standard is adjusted, or an outer surface of the primary reflector 12 in an area associated with each smaller facet 32 that does not meet the predetermined standard is re-shaped. The adjustment or re-shaping is used to bring the identified smaller facet 32 to the desired predetermined standard.

Figure 6:
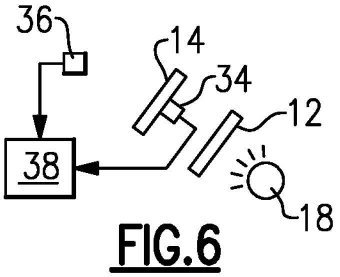
FIG. 6 is a schematic representation of a system for analyzing light intensity for the vehicle lamp assembly.

In one example, after each reflector area 30 is cut into small facets 32, an illuminance sensor 34 is set on the inner lens 14, and an intensity sensor 36 is set out in a far field position as shown in FIG. 6. Each facet illuminance contribution is then traced on the inner lens 14, and luminous intensity in the far field is determined. The sensor data is sent to a processing unit 38 such that each facet performance can be analyzed.

The processing unit 38 can include computer with a processor, memory, and one or more input and/or output (I/O) device interface(s) that are communicatively coupled via a local interface. The computer comprises a hardware device for executing software, particularly software stored in memory. The software in the memory may include one or more separate programs, each of which includes an ordered listing of executable instructions for implementing logical functions. Software in memory, in whole or in part, is read by the processor and then executed. In one example, software such as Catia is used to build 3D CAD, software such as LucidShape is used to check the far field luminous intensity, and software such as Ansys SPEOS is used to check lamp lit appearance.

The processing unit 38 analyzes the sensor data to identify each facet 32 that does not contribute a sufficient light intensity for the far field position. For each identified facet 32, the facet is rotated within its associated area to generate a uniform illuminance on a target area of the inner lens 14. If one facet 32 does not receive enough light from an associated light source 18, a position of the light source is adjusted to increase light collect efficiency. If moving the light source position does not achieve the desired effect for that particular facet, a parabola reflector and parabola axis points are built to target a designated area of the inner lens 14. In one example, this involves re-shaping a surface area of the cubic structures within the identified facet 32 to provide a parabola shaped surface that will focus light to the designated area. This parabola facet will then boost light in this area on the inner lens 14. Once the predetermined standard is met for each facet area, an overall surface of the primary reflector 12 is smoothed out to provide smooth transitions between different shaped outer surface contours for each facet 32, and a finalized lamp assembly can be formed that comprises at least the light source 18, the primary reflector 12, the inner lens 14, and the outer lens 16.

By using this method, the inner lens 14 will receive more uniform illuminance. Further, after light passes through the plurality of small pillow lenses 22 and textured surface 26 on the inner lens 14, the lamp assembly 10 will have homogeneous appearance.

In one example, the parabola built in each select facet 32 will be formed to fit the facet size. As mentioned above, the resulting reflector 12 after re-shaping will not be very smooth, and programs, e.g. CAD programs, can be utilized to adjust the final reflector overall outer surface shape based on draft angle and tooling requirements. In one example, optical software features are used to generate cubic prism small facets to colimate light from the light source to have 5 degrees left and right, as well as a 5 degrees up and down, beam pattern using reflector optics. These colimated lights strike on the inner lens, which has the small pillow lenses and textured surface to further spread the light to meet requirements. This area of the facet is cut/divided into a plurality of smaller facets to analyze the individual facet performance and the shape of the outer surface of the reflector can be adjusted within each smaller facet. By designing the reflector in this manner, the vehicle lamp can meet light requirements and have a desired homogeneous appearance.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method of forming a vehicle lamp that includes at least a light source, a primary reflector, and an inner lens, the method comprising:

dividing a facet area of the primary reflector into a plurality of smaller facets;

analyzing light intensity performance for each smaller facet;

comparing the light intensity performance for each smaller facet to a predetermined standard;

identifying smaller facets that do not meet the predetermined standard; and adjusting a position of the light source associated with each smaller facet that does not meet the predetermined standard or re-shaping an outer surface of the primary reflector in an area associated with each smaller facet that does not meet the predetermined standard.

2. The method of claim 1, including adjusting the position of the light source associated with each smaller facet that does not meet the predetermined standard or re-shaping the outer surface of the primary reflector in the area associated with each smaller facet that does not meet the predetermined standard until the predetermined standard is met for each facet.

3. The method of claim 1, wherein analyzing light intensity performance for each smaller facet further includes setting an illuminance sensor on the inner lens, placing an intensity sensor in a far field position, and tracing each smaller facet illuminance contribution from the light source on the inner lens and luminous intensity in the far field position.

4. The method of claim 1, wherein, prior to adjusting a position of the light source or re-shaping an outer surface of the primary reflector in an area associated with each smaller facet that does not meet the predetermined standard, the method includes:

for each identified smaller facet that does not contribute a sufficient amount of light intensity to far field intensity, rotating each identified smaller facet until a uniform illuminance is generated on a target area of the inner lens.

5. The method of claim 4, further including, if after rotating the identified smaller facet, the identified smaller facet still does not receive enough light from the light source, adjusting the position of the light source to increase light collect efficiency.

6. The method of claim 5, further including, if adjusting the position of the light source does not result in the identified smaller facet meeting the predetermined standard, subsequently forming a parabola reflector for the identified smaller facet to target a specified area of the inner lens.

7. The method of claim 1, wherein each smaller facet is comprised of a plurality of cubic surfaces.

8. The method of claim 1, wherein the light source comprises a plurality of LEDs.

9. The method of claim 1, including providing an outer lens over the inner lens, and positioning the inner lens such that an exterior facing side of the inner lens faces the outer lens and an interior facing side of the inner lens faces the primary reflector.

10. The method of claim 9, wherein the exterior facing side of the inner lens includes a plurality of pillow lenses.

11. The method of claim 10, including forming a textured surface on the interior facing side.

12. The method of claim 9, wherein the outer lens is clear.

13. The method of claim 9, wherein once the predetermined standard is met for each facet area, forming a finalized lamp assembly comprising the light source the primary reflector, the inner lens, and the outer lens.

14. A vehicle lamp comprising:

a light source;

a primary reflector that reflects light from the light source;

an inner lens that receives reflected light from the primary reflector;

an outer lens outward of the inner lens, wherein the inner lens has an exterior facing side that faces the outer lens and an interior facing side that faces the primary reflector; and wherein the primary reflector is divided into a plurality of facet areas that each have a contoured outer surface specific to each facet area to provide required light intensity and a homogeneous appearance.

15. The vehicle lamp of claim 14, wherein each facet area is divided into a plurality of smaller facets, and wherein light performance for each smaller facet within an associated facet area is used to determine the contoured outer surface specific to that associated facet area.

16. The vehicle lamp of claim 14, wherein the light source comprises a plurality of LEDs.

17. The vehicle lamp of claim 14, wherein the exterior facing side includes a plurality of pillow lenses.

18. The vehicle lamp of claim 17, wherein the interior facing side of the inner lens comprises a textured surface.

19. The vehicle lamp of claim 18, wherein the exterior facing side of the inner lens directly faces the outer lens and the interior facing side of the inner lens directly faces the primary reflector.

20. The vehicle lamp of claim 14, wherein the outer lens is clear.

21. The method of claim 6, wherein each smaller facet is comprised of a plurality of cubic structures, and further including re-shaping a surface area of cubic structures within the identified smaller facet to provide a parabola shaped surface that focuses light to a designated area.

22. The method of claim 21, wherein, once the predetermined standard is met for each facet area, an overall surface of the primary reflector is smoothed out to provide smooth transitions between different shaped outer surface contours for each facet to provide a finalized lamp assembly.

23. The method of claim 1, wherein the step of adjusting the position of the light source or re-shaping the outer surface of the primary reflector is performed until the predetermined standard is met for each facet area, and then subsequently smoothing out an overall surface of the primary reflector to provide a finalized lamp assembly.

* * * * *